Feb. 5, 1952 — O. J. POUPITCH — 2,584,813
FASTENER FOR SECURING MOLDING TRIMS
Filed Oct. 15, 1947
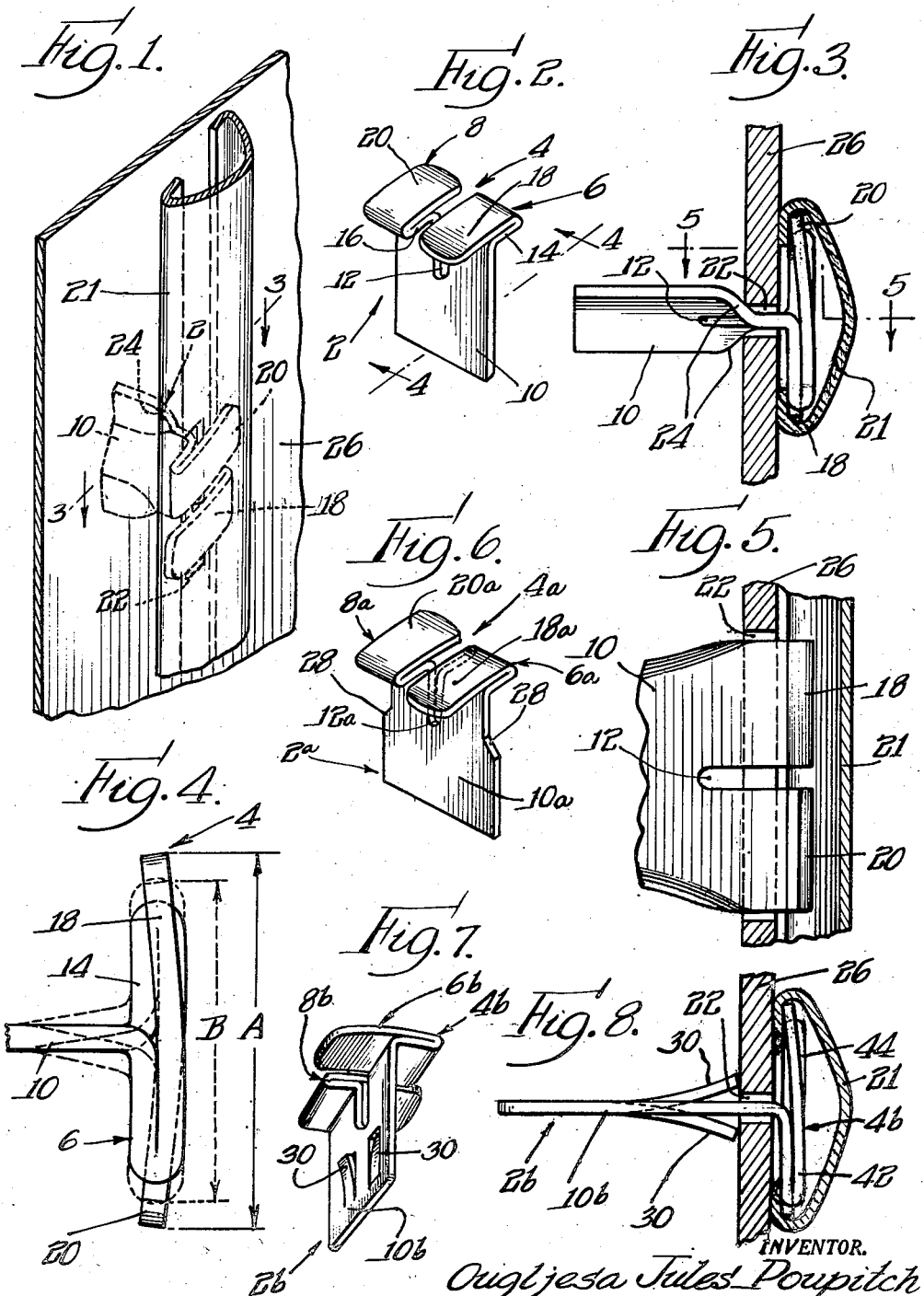
INVENTOR.
Ougljesa Jules Poupitch Patented Feb. 5, 1952

2,584,813

UNITED STATES PATENT OFFICE 2,584,813

FASTENER FOR SECURING MOLDING TRIMS

Ougljesa Jules Poupitch, Chicago, Ill., assignor to Illinois Tool Works, Chicago, Ill., a corporation of Illinois Application October 15, 1947, Serial No. 780,004

2 Claims. (Cl. 85—5)

This invention relates generally to an improvement in sheet metal fastening devices, and is directed more particularly to a one-piece sheet metal fastener for securing molding trim and other like objects to apertured work pieces.

Molding trim which has been in common use as an ornamentation for automobiles and the like consists of a strip of metal, usually polished stainless steel, said strip being arcuate in cross-section and having inturned flanges along each longitudinal margin. Fasteners employed to secure the molding in place must engage the inner surface of these flanges on one side of an apertured work piece, and must extend through the aperture of the work piece and interlock or latchingly engage the opposite side. The fasteners or clips are usually applied to the molding strip prior to the application of the strip to the work surface, and the fasteners are distributed in spaced relation conforming with the spacing of the complementary apertures in the work piece. Hence, it is important that these fasteners engage the interior of the molding trim with sufficient friction to prevent inadvertent or unauthorized longitudinal displacement after the fasteners have been properly positioned in spaced relation in the strip. The present invention contemplates a molding fastener or clip of extremely simple construction, yet having the required strength and other structural and functional features essential for its intended use. To this end the invention contemplates a fastener which may be produced from flat sheet stock by the practice of conventional stamping and forming methods.

More specifically, the invention contemplates a one-piece sheet metal fastener as set forth above having a resilient or yieldable head structure designed to facilitate its initial application to, and subsequent positioning within, the hollow areas of a strip of molding trim.

It is a further object of the present invention to provide molding clips or fasteners of the type referred to above in which the head structure is made up of a plurality of sections which may be shifted transversely of the shank axis, and the shank may be conveniently latched against the inner surface of a work piece after a molding strip has been applied to the outer surface thereof.

Another object of the present invention is to provide a fastener for molding trim equipped with a resilient head section of extremely simple and novel form which may be snapped into the open side of a strip of molding trim, and automatically positioned within the molding by frictionally contacting the inner surface thereof.

The foregoing and other objects and advantages will be more apparent from the foregoing detailed description when considered in connection with the accompanying drawings, wherein:

Figure 1 is a perspective view of one embodiment of the fastener shown in assembled relation with a molding and a work piece;

Figure 2 is a perspective view of the fastener shown in Figure 1;

Figure 3 is a sectional view taken along the line 3—3 of Figure 1;

Figure 4 is an enlarged side view of the head of the fastener shown in Figure 2;

Figure 5 is a sectional view taken along line 5—5 of Figure 3;

Figure 6 is a perspective view of a modified fastener;

Figure 7 is a perspective view of still another embodiment of the invention;

Figure 8 is a sectional view similar to Figure 3 showing the embodiment of Figure 7 in assembled relation with the molding and a work piece;

One embodiment of the invention is shown in perspective in Figure 2 and is designated generally by the numeral 2. The molding clip or fastener 2 includes a head structure designated generally by the numeral 4, and this head structure comprises two head sections 6 and 8 formed integral with one extremity of a shank 10. It will be apparent that the fastener 2 may be produced from a single strip of metallic stock by first providing the strip at one end with a centrally positioned severance or notch 12. The two strips thus separated by the severance 12 are then bent laterally with respect to the shank and subsequently folded back to form a reverse bend. This folding operation results in providing portions 14 and 16 of double thickness stock extending in opposite directions and at substantially right angles to the shank and portions 18 and 20 of single thickness stock extending oppositely from each of their companion portions 14 and 16. The portions 18 and 20 are longer than the portions 14 and 16, as will be clearly evident from Figures 3 and 4. The head sections 6 and 8 are also somewhat arcuate in cross-section, as viewed in Figures 3 and 4. The portions 18, 20 of single thickness are directed inwardly of the shank so that the rounded end of each is disposed in the plane of the inner layer of the corresponding opposite double layer end.

It will be noted that the severance or notch 12 extends into the shank portion 10 a sufficient distance to render yieldable those portions of the shank immediately adjacent the head structure. In other words, by providing the severance extending into the shank the head sections 6—8 may be shifted or sprung transversely of the shank for purposes about to be described. The distance A, Figure 4, between parallel lines touching the free extremities of the head portions 18 and 20 is normally greater than the internal width of the molding strip 21 for which the fastener is designed to be used. By applying pressure to the head sections 6—8 in a direction transverse to the shank, these sections may be shifted from the solid line position to the dotted line position illustrated in Figure 4. The overall width of the combined head sections is thereby reduced to the distance B, and by reducing this overall width to the distance B the head 14 may be sprung into the hollow of the molding strip 21. When the pressure is released the free margins of the head portions 18 and 20 spring outwardly into frictional engagement with opposite inner surface portions of the molding trim, thereby exerting a sufficient friction between the fastener and the trim to prevent inadvertent shifting of the fastener longitudinally of the molding. By having the corners of the projecting portions 18—20 rounded, the ease with which the fastener may be inserted from the end of the molding trim is materially facilitated.

In actual use the fasteners or molding strips are first applied to the molding in a spaced relation corresponding with the spacing of apertures 22. The molding may then be applied to the work by telescopically associating the shanks 10 with their companion apertures 22. With the molding positioned as shown in Figures 1 and 3 the shank may then be twisted so as to provide shoulders 24 which abut the inner surface of the work piece 26, thereby securely clamping the molding 21 in place. The apertures 22 are preferably of rectangular or elliptical shape corresponding generally with the cross-sectional shape of the shank 10. Obviously, other shapes of openings may be employed to conform with shanks of other conventional shape.

In Figure 6 a slightly modified form of molding clip is shown designated generally by the numeral 2a. This fastener 2a is similar in all respects to the fastener 2 previously described, except that the shank 10a is provided with shoulders 28 to facilitate latching of the fastener against the inner surface of the work piece. Portions of the fastener 2a structurally similar to the fastener 2 are given corresponding numbers bearing the suffix "a."

Figures 7 and 8 disclose a still further fastener modification designated generally by the numeral 2b. This fastener 2b differs only from the fastener 2 previously described in the provision of latching fingers 30 for interlocking with the inner surface of the work piece 26. These latching fingers 30 are struck from the body of the shank 10b, and are designed to be pushed through the work aperture 22 so as to ultimately occupy the latching position shown in Figure 8. In this form of fastener the locking fingers 30 make it unnecessary to twist the shank after the fastener has been fully inserted within the work aperture.

From the foregoing it will be apparent that the present invention provides a fastener or clip of extremely simple structural form, as well as a fastener which may be produced very economically from flat sheet stock. By having the portion of the shank in the vicinity of the head structure severed or relieved so as to render this area of the shank more resilient, the ease with which the head sections may be shifted transversely of the shank axis is greatly facilitated. It will also be apparent that the invention contemplates a fastener which may be combined with a molding trim or strip either by inserting it from one end thereof or by snapping or locking it into position. The fastener of the present invention may be used in instances where the molding strip is made of relatively resilient stock, as well as in instances where the molding strip material is quite rigid and incapable of being flexed without the application of considerable force. The fastener described herein, although of extremely simple structural form and capable of being produced from relatively thin sheet stock, is very strong and will withstand high stresses acting either transversely or longitudinally of the fastener. It will also be understood that the head sections contemplated hereby are not only transversely shiftable due to the resiliency of the severed area of the adjacent shank portion, but are also flexible axially of the fastener. This axial flexing of the head sections cooperates with the latching engagement of the shank with the inner surface of the work piece to secure more firmly the molding trim against the outer surface of the work piece.

While for purposes of disclosure, certain structural embodiments have been described herein, it will be understood that other modifications and changes are contemplated hereby without departing from the spirit and scope of the appended claims.

The invention is hereby claimed as follows:

1. A one-piece sheet metal molding clip for mounting channel-shapped moldings with inturned flanges upon a work piece and comprising a plate-like shank having at one end a short and substantially uniform, narrow, longitudinal severance to present a pair of normally coplanar plate-like elements, each being approximately half the width of the shank and flexible transversely of the plane of the shank, and said shank having at the opposite end thereof below the longitudinal severance a relatively rigid and substantially planar entering end section for insertion within a work aperture, a head section including a plurality of adjacently positioned separate head members on opposite sides of the longitudinal severance and of substantially the width of a corresponding plate-like element, each head member consisting of a continuation of the stock of a corresponding one of said plate-like elements in the form of a return double layer bend with the inner layer disposed at substantially right angles to the shank and with the outer layer bent back upon the inner layer, each double layer bend projecting substantially normally of the shank on opposite sides thereof and terminating in a free single layer extremity also oppositely projecting substantially normally from opposite sides of the shank, each single layer extremity being directed inwardly to position the end margin thereof substantially in the plane of the inner layer of its corresponding opposite double layer bend and each said end margin normally projecting laterally from the shank a distance greater than the end margin of the double layer bend on the adjacent head member at the same side of said shank, and said head members being shiftable transversely with transverse flexing of said plate-like elements to bring the end margins of adjacent head members toward substantial alignment parallel to the plane of the entering end of the shank for reducing the maximum transverse extent of the head members between the free margins of the single layer extremities whereby to facilitate operative association thereof with opposed inturned flanges of a complementary channel-shaped molding strip on one face of the work piece, and said shank having deformable portions for engaging the opposite face of the work piece.

2. A one-piece sheet metal molding clip as claimed in claim 1, wherein the opposite edges of the shank are provided with shoulders spaced from and facing toward the head members and each normally disposed in the plane of the shank.

OUGLJESA JULES POUPITCH.

REFERENCES CITED

The following references are of record in the file of this patent:

UNITED STATES PATENTS

| Number | Name | Date |
|---|---|---|
| 1,998,366 | Geyer | Apr. 16, 1935 |
| 2,068,633 | Upham | Jan. 19, 1937 |
| 2,084,015 | Bronson | June 15, 1937 |
| 2,129,949 | Lombard | Sept. 13, 1938 |
| 2,175,814 | Pender | Oct. 10, 1939 |
| 2,196,417 | Kelsen | Apr. 9, 1940 |
| 2,258,742 | Cotter | Oct. 14, 1941 |
| 2,319,058 | Hansman | May 11, 1943 |
| 2,400,545 | Kost | May 21, 1946 |

FOREIGN PATENTS

| Number | Country | Date |
|---|---|---|
| 15,005 | Great Britain | Mar. 13, 1913 |